(12) United States Patent
Dobbs et al.

(10) Patent No.: US 7,276,813 B2
(45) Date of Patent: Oct. 2, 2007

(54) REDUNDANT INPUT POWER SYSTEM

(75) Inventors: Robert William Dobbs, Granite Bay, CA (US); Andrew Michael Cherniski, Rescue, CA (US); John M. Swope, Sacramento, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 577 days.

(21) Appl. No.: 10/773,008

(22) Filed: Feb. 5, 2004

(65) Prior Publication Data

US 2005/0184590 A1    Aug. 25, 2005

(51) Int. Cl.
*H02J 7/00* (2006.01)
(52) U.S. Cl. ........................................ 307/65
(58) Field of Classification Search ........... 307/65
See application file for complete search history.

(56) References Cited

U.S. PATENT DOCUMENTS 5,191,529 A    3/1993    Ramsey et al. ............ 366/424
5,828,892 A *  10/1998   Mizuta ..................... 713/300

FOREIGN PATENT DOCUMENTS

| EP | 1107437 A2 * | 6/2001 |
| JP | 3243119 | 10/1991 |
| JP | 6070486 | 3/1994 |
| JP | 2003087994 | 3/2003 |

* cited by examiner

*Primary Examiner*—Robert L. Deberadinis

(57) ABSTRACT

A power system provides for redundant input power sources. The power system includes a plurality of inputs that are connectable to a plurality of input sources and an OR circuit coupled to the source inputs. The OR circuit ORs the input sources to provide a source voltage. The power control circuit that is responsive to sufficient source voltage and other commands provides a working voltage to mid- and low-rail converters to provide supply voltages for use by a load.

25 Claims, 1 Drawing Sheet

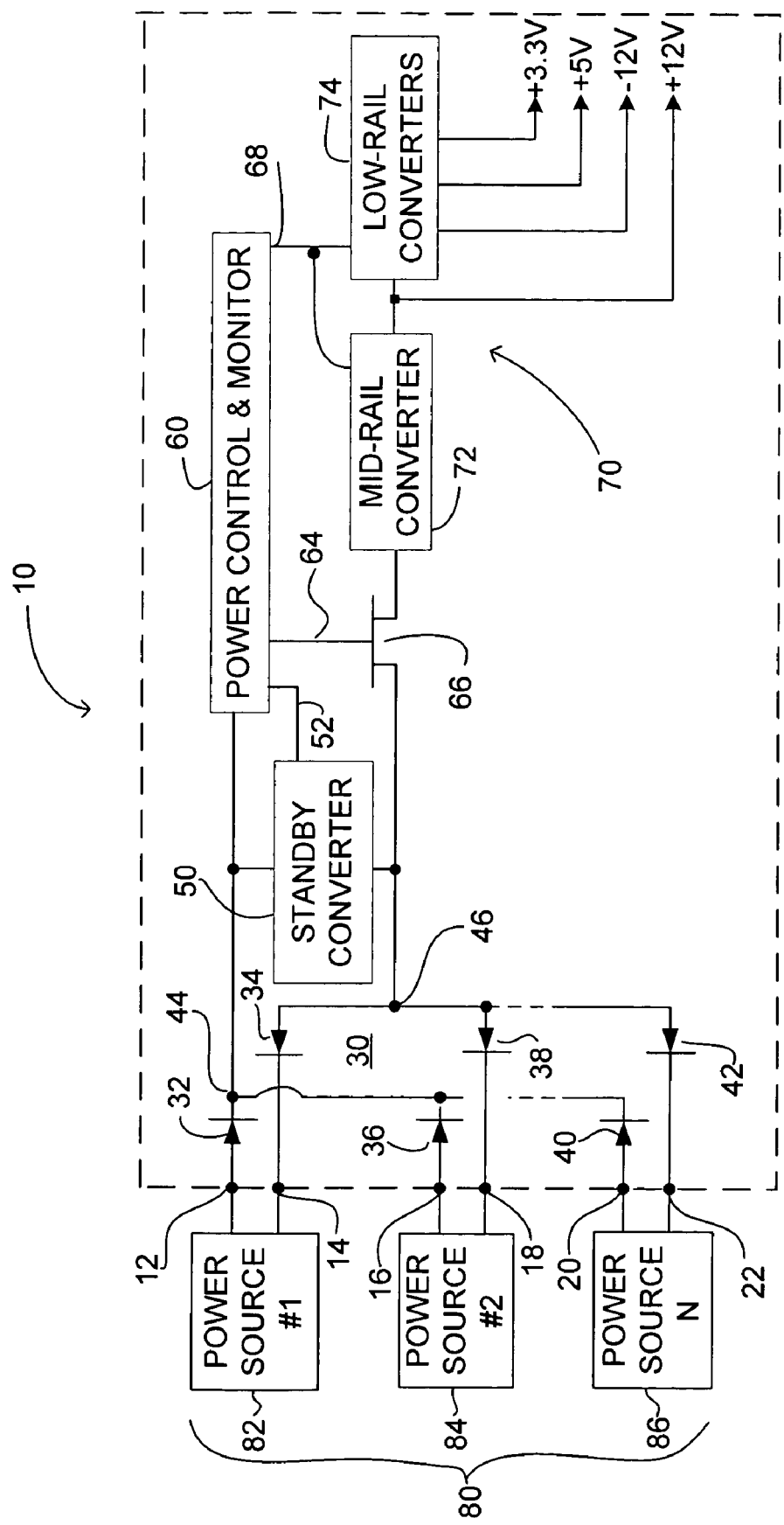

REDUNDANT INPUT POWER SYSTEM

BACKGROUND OF THE INVENTION

The present invention is generally directed to a power system for providing power to a plurality of loads, such as, a computer system. The present invention is more particularly directed to such a power system which is capable of being sourced by redundant sources to provide flexibility and reliability.

There are many applications where a power system must provide reliable power to the system which it powers. A computer system is one example.

Previous computer systems were generally provided with their own AC input power supplies. These AC "front-end" supplies produced positive DC voltage outputs. From these positive DC voltage outputs, power subsystems produced mid-and low-rail voltages. When these computer systems needed to be adapted for use in the Telecom industry, power system redesign was required due to the −48 V DC voltages available to power the computer system. In the end, the computer system power supplies for the Telecom industry were difficult to design, required higher component density, were more expensive, and required long lead-times. To provide power supply redundancy for reliability, two similar supplies were generally employed.

The present invention addresses the above issues. For example, it provides a power system which may use −48 V DC directly to provide the necessary mid- and low-rail voltages. In accordance with a further feature, the present invention provides a power system which provides all of the voltages necessary for powering a Telecom industry computer system directly from the existing power environment negating the need for new "front-end" supply development. In accordance with a further feature provided by an embodiment of the present invention, redundant source inputs may be readily accommodated whether the source inputs are direct DC sources or DC sources derived from a separate AC supply. Also, such redundant sources may be mixed sources of AC "front-end" sources and DC sources. This permits the computer system to operate from both AC and DC feeds so that either feed can drop out and the computer will still be powered.

SUMMARY OF THE INVENTION

The invention provides a power system including a plurality of source inputs that are connectable to a plurality of input sources, an OR circuit coupled to the source inputs and having an output, and a power monitor coupled to the OR circuit output that provides a control signal responsive to a sufficient source voltage at the OR circuit output. The system further includes a power control circuit that is coupled to the OR circuit output and responsive to the control signal, provides a working voltage, and at least one converter circuit that converts the working voltage to a supply voltage.

In accordance with one embodiment of the present invention, the OR circuit is a diode OR circuit. Schottky type diodes may be used to reduce power consumption. A power switch may couple the working voltage to at least one converter circuit. The power switch may be a power FET.

In accordance with further features of the present invention, the power control circuit may be further responsive to command signals to provide the working voltage. The at least one converter circuit may provide at least one of the command signals. The at least one converter circuit may include mid-rail converter and/or a low-rail converter.

The invention further provides a method of providing a supply voltage comprising providing a plurality of source input voltages, ORing the source input voltages to provide a source voltage, monitoring the source voltage, generating a control signal responsive to the source voltage being above a given level, responsive to the control signal, providing a working voltage from the source voltage and converting the working voltage to a supply voltage.

BRIEF DESCRIPTION OF THE DRAWINGS

The foregoing aspects and many of the attended advantages of this invention will become more readily appreciated as the same become better understood by reference to the following detailed description, when taken in conjunction with the accompanying drawing, wherein the sole FIGURE is a schematic block diagram of an embodiment of a power system of the present invention.

DESCRIPTION OF THE INVENTION

In the following detailed description of an exemplary embodiment of the invention, reference is made to the accompanying drawing, which forms a part hereof. The detailed description and drawing illustrates specific exemplary embodiments by which the invention may be practiced. These embodiments are described in sufficient detail to enable those skilled in the art to practice the invention. It is understood that other embodiments may be utilized, and other changes may be made, without departing from the spirit or scope of the present invention. The following detailed description is therefore not to be taken in a limiting sense, and the scope of the present invention is defined by the appended claims.

Referring now to the sole FIGURE, it illustrates a power system 10 configured in accordance with one embodiment of the present invention. The power system 10 generally includes a plurality of source input terminals 12, 14, 16, 18, 20, and 22, an OR circuit 30, a standby converter 50, a power control circuit 60, and a plurality of voltage converters 70.

The input terminals 12, 14, 16, 18, 20, and 22 permit the power system 10 to be coupled to a plurality of input sources 80. The input sources include power sources 82, 84, and 86. Although three input sources have been illustrated in the FIGURE, it will be noted that any number of input sources may be accommodated by the power system 10. In addition, the input sources may be mixed input sources. For example, one or more of the input sources may be a direct feed of a DC voltage, such as −48 V DC, while another one or more of the input sources may be an AC power supply which converts AC voltage to a DC output voltage of, for example, −48 V DC.

The input terminals 12, 14, 16, 18, 20, and 22 are coupled to the OR circuit 30. The OR circuit 30 may be a diode power OR circuit and include diodes 32, 34, 36, 38, 40, and 42. Each pair of diodes, 32 and 34, 36 and 38, and 40 and 42, forms an OR circuit corresponding to each of the input sources 82, 84, and 86. The diodes 32, 36, and 40 are supply diodes and diodes 34, 36, and 42 are return diodes. In ORing the input sources together, the OR circuit 30 provides a source voltage at its output across nodes 44 and 46.

The standby converter 50 comprises a voltage converter to produce a standby voltage rail. It is coupled across the output of the OR circuit 30 and produces the standby voltage rail, whenever the input voltage is sufficient. The standby converter 50 provides a stable standby voltage rail to the power control circuit 60 over line 52 when it detects a sufficient source voltage at the OR circuit output across nodes 44 and 46.

The power control circuit 60 comprises a power control and monitor which is coupled to node 44 of the OR circuit 30 and to a power switch 66. The power control circuit 60 uses the standby rail 52 relative to node 44 for its energy source. Responsive to a valid standby voltage 52, and other command inputs, the power control circuit 60 controls the power switch 66 via output signal line 64.

The power switch 66, in accordance with this embodiment, is a power field effect transistor (FET) which is turned on by the working voltage on line 64. When the FET 66 is turned on, the working voltage node 46 relative to node 44 is provided to the plurality of converters 70 to enable the converters to provide the necessary voltages for use by the system powered by the power system 10. As previously mentioned, the system to be powered by the power system 10 may be a computer system and more particularly a computer system associated with a Telecom environment.

The plurality of converters comprise a mid-rail converter 72 and a low-rail converter 74. From the working voltage provided by the power control circuit 60 via the turned on power switches 66, the mid-rail converter 72 may provide +12 V DC. The low-rail converter is coupled to the mid-rail converter for using its +12 V DC output to provide low-rail voltage outputs of, for example, +5.0 V DC, +3.3 V DC, and −12.0 V DC. The converters 72 and 74 are coupled to an input 68 of the power control circuit 60 to provide command signals to the power control circuit 60. The command signals may be status signals, for example. The power control 60 may further receive at its input 68 command signals from other sources such as physical switches, fault detection or control circuits, and/or remote power control logic signals.

Although the OR circuit 30 is shown herein as being a diode or circuit, it may take other forms. For example, the diodes 30 of circuit 30 may be replaced by controlled field effect transistors, or other circuitry.

In operation, a DC supply voltage, such as −48 V DC may be provided to the input terminals 12, 14, 16, 18, 20, and 22 by redundant input sources 82, 84, and 86. The input sources may be one or more direct DC voltage feeds or −48 V DC derived from an AC power supply. Supplied current flows through diodes 32, 36, and 40 to node 44. This supplies current to the standby converter 50 and the power control circuit 60. Current returned to the input sources is from node 46 through diodes 34, 38, and 42. Whenever there is a sufficient supply voltage across nodes 44 and 46, the standby converter 50 provides a control voltage or standby voltage rail on line 52 to the power control circuit 60. This standby voltage may be regulated voltage to power the power control circuit and other circuits in a manner known in the art. Responsive to receiving the standby voltage from the standby converter 50 and command inputs at input 68, the power control circuit 60 provides a working voltage on line 64 which is provided to the mid-rail converter 72 through the power FET 66. The mid-rail converter, from the working voltage, generates its output which may be +12 V DC. The output of the mid-rail converter is also provided to the low-rail converter which, from the output of the mid-rail converter generates its outputs. The low-rail converter may provide, for example, +5.0 V DC, +3.3 V DC, and −12.0 V DC.

As may be seen from the foregoing, the power system 10 may receive power from redundant inputs. The redundant inputs may be of virtually any number and may be mixed inputs to add to the flexibility and reliability of the power system 10. Hence, any one of the redundant inputs may fail, and the power system 10 will be able to still power its associated load. The input sources 82, 84, and 86 may be within the same chassis housing the computers, or may be fed over cables to the input terminals of the system 10. In addition, the diodes of the OR circuit 30 prevent damage to the system should an input source be coupled to the system in reversed polarity. Thus, protection is provided against damaging the power system 10, the power sources 80, or system wiring. In addition, this also prevents associated breakers or fuses from tripping.

Although the present invention has been described in considerable detail with reference to certain preferred embodiments, other embodiments are possible. Therefore, the spirit or scope of the appended claims should not be limited to the description of the embodiments contained herein. It is intended that the invention resides in the claims.

We claim:

1. A power system comprising:
    a plurality of source inputs that are connectable to a plurality of input sources;
    an OR circuit coupled to the source inputs and having an output;
    a standby converter coupled to the OR circuit output that provides a voltage rail responsive to a sufficient source voltage at the OR circuit output;
    a power control circuit that is coupled to the standby converter and, responsive to a control signal, provides a working voltage; and
    at least one converter circuit that converts the working voltage to a supply voltage.

2. The power system of claim 1 wherein the OR circuit is a diode OR circuit.

3. The power system of claim 2 wherein the diode OR circuit is a Schottky power diode OR circuit.

4. The power system of claim 1 further including a power switch that couples the working voltage to the at least one converter circuit.

5. The power system of claim 4 wherein the power switch is a power FET.

6. The power system of claim 1 wherein the power control circuit is further responsive to command signals to provide the working voltage.

7. The power system of claim 6 wherein the at least one converter circuit provides at least one of the command signals.

8. The power system of claim 1 wherein the at least one converter circuit includes a low-rail converter.

9. The power system of claim 8 wherein the at least one converter circuit further includes a mid-rail converter.

10. The power system of claim 1 wherein the at least one converter circuit includes a mid-rail converter.

11. A power system comprising:
    a plurality of source inputs that are connectable to a like plurality of DC voltage input sources;
    an OR circuit coupled to the source inputs and having an output;
    a standby converter coupled to the OR circuit output that provides a voltage rail responsive to a sufficient source voltage at the OR circuit output;
    a power control circuit that is coupled to the standby converter and, responsive to a control signal, provides a working voltage; and
    a plurality of converter circuits that convert the working voltage to a plurality of different DC supply voltages.

12. The power system of claim 11 wherein the OR circuit is a diode OR circuit.

13. The power system of claim 11 further including a power switch that couples the working voltage to the at least one converter circuit.

14. The power system of claim 13 wherein the power switch is a power FET.

15. The power system of claim 11 wherein the power control circuit is further responsive to command signals to provide the working voltage.

16. The power system of claim 15 wherein the plurality of converter circuits provides one of the command signals.

17. The power system of claim 11 wherein the plurality of converter circuits includes a mid-rail converter.

18. The power system of claim 11 wherein the plurality of converter circuits includes a low-rail converter.

19. A power system comprising:
a plurality of source inputs that are connectable to a like plurality of DC voltage input sources;
a diode OR circuit coupled to the source inputs and having an output;
a standby converter coupled to the OR circuit output that provides a voltage rail responsive to a sufficient source voltage at the OR circuit output;
a power control circuit that is coupled to the standby converter and, responsive to a control signal, provides a working voltage; and
a plurality of converter circuits that convert the working voltage to a plurality of supply voltages; and
a power switch that couples the working voltage from the control circuit to the converter circuits.

20. The power system of claim 19 wherein the power switch is a power FET.

21. The power system of claim 19 wherein the power control circuit is further responsive to command signals to provide the working voltage.

22. The power system of claim 21 wherein the plurality of converter circuits provides at least one of the command signals.

23. The power system of claim 19 wherein the plurality of converter circuits includes a mid-rail converter.

24. The power system of claim 19 wherein the plurality of converter circuits includes a low-rail converter.

25. A method of providing a supply voltage comprising:
simultaneously providing a plurality of source input voltages;
ORing the source input voltages to provide a source voltage;
monitoring the source voltage;
generating a control signal responsive to the source voltage being above a given level;
responsive to the control signal, providing a working voltage from the source voltage; and
converting the working voltage to a supply voltage.

* * * * *